(12) United States Patent
Butler

(10) Patent No.: US 10,710,327 B2
(45) Date of Patent: Jul. 14, 2020

(54) METHODS FOR MAKING COMPOSITE PARTS FROM STACKED PARTIALLY CURED SUBLAMINATE UNITS

(71) Applicant: The Boeing Company, Chicago, IL (US)

(72) Inventor: Geoffrey A. Butler, Seattle, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 15/829,780

(22) Filed: Dec. 1, 2017

(65) Prior Publication Data
US 2019/0168481 A1 Jun. 6, 2019

(51) Int. Cl.
*B29C 65/00* (2006.01)
*B32B 3/26* (2006.01)
(Continued)

(52) U.S. Cl.
CPC .............. *B32B 3/266* (2013.01); *B29C 70/00* (2013.01); *B29C 70/44* (2013.01); *B29C 70/543* (2013.01); *B29C 70/545* (2013.01); *B32B 7/12* (2013.01); *B32B 37/06* (2013.01); *B32B 37/1018* (2013.01); *B32B 37/12* (2013.01); *B32B 37/1207* (2013.01); *B32B 37/18* (2013.01); *B32B 38/1866* (2013.01);
(Continued)

(58) Field of Classification Search
CPC ........... B32B 7/12; B32B 37/06; B32B 37/12; B29C 65/18; B29C 65/20; B29C 65/48; B29C 65/4815; B29C 65/70; B29C 66/02; B29C 66/41; B29C 66/45; B29C 66/721; B29C 66/723; B29C 67/0011; Y10T 156/1002; Y10T 156/1028; Y10T 156/1089; Y10T 156/1092
USPC .................... 156/196, 297, 299, 307.1, 307.4
See application file for complete search history.

(56) References Cited

U.S. PATENT DOCUMENTS 4,604,319 A * 8/1986 Evans ................... B29C 70/086
  428/113
4,683,018 A * 7/1987 Sutcliffe ................. B29C 33/68
  156/196
(Continued)

OTHER PUBLICATIONS

Piana et al., "Novel Manufacturing Route for Affordable Thermoset Composite Primary Structures," CAMX Technical Paper TP-17.

*Primary Examiner* — Mark A Osele
*Assistant Examiner* — Nickolas R Harm
(74) *Attorney, Agent, or Firm* — Ostrager Chong Flaherty & Broitman P.C.

(57) ABSTRACT

A method of forming a composite article. One step involves applying adhesive on surfaces of a plurality of sublaminate units, each ply of each sublaminate unit comprising fibers impregnated with resin which has been initially cured to 30% to 50% of full cure. The initially cured sublaminate units are then arranged in a stack, which stack is pressed against a surface of a forming tool. While pressure is being applied, the stack is heated to an intermediate temperature above a glass transition temperature of the resin for a time interval sufficient to intermediately cure the resin to 50% to 70% of full cure to form a composite laminate having a contour defined by the surface of the forming tool. Then the resin is finally cured at a final temperature higher than the intermediate temperature.

20 Claims, 10 Drawing Sheets

(51) Int. Cl.
- *B32B 7/12* (2006.01)
- *B32B 37/06* (2006.01)
- *B32B 37/12* (2006.01)
- *B32B 38/18* (2006.01)
- *B32B 37/18* (2006.01)
- *B29C 70/44* (2006.01)
- *B29C 70/54* (2006.01)
- *B29C 70/00* (2006.01)
- *B32B 37/10* (2006.01)
- *B32B 38/00* (2006.01)
- *B29C 65/48* (2006.01)
- *B29C 65/70* (2006.01)
- *B29C 67/00* (2017.01)

(52) U.S. Cl.
CPC .......... *B29C 65/48* (2013.01); *B29C 65/4815* (2013.01); *B29C 65/70* (2013.01); *B29C 66/02* (2013.01); *B29C 66/41* (2013.01); *B29C 66/45* (2013.01); *B29C 66/721* (2013.01); *B29C 66/723* (2013.01); *B29C 67/0011* (2013.01); *B32B 2038/0076* (2013.01); *B32B 2305/076* (2013.01); *B32B 2305/72* (2013.01); *B32B 2309/02* (2013.01); *Y10T 156/1002* (2015.01); *Y10T 156/1028* (2015.01); *Y10T 156/1089* (2015.01); *Y10T 156/1092* (2015.01)

(56) References Cited

U.S. PATENT DOCUMENTS

| | | | |
|---|---|---|---|
| 4,750,961 A * | 6/1988 | Pflug | B29C 53/04 156/212 |
| 5,672,311 A | 9/1997 | May et al. | |
| 5,834,668 A | 11/1998 | Kumano et al. | |
| 5,954,898 A | 9/1999 | McKague et al. | |
| 6,852,259 B2 | 2/2005 | Michael | |
| 7,182,832 B2 | 2/2007 | Behnke et al. | |
| 7,879,177 B2 * | 2/2011 | McCowin | B29C 70/386 156/251 |
| 9,539,767 B2 | 1/2017 | Butler | |
| 2010/0252180 A1 | 10/2010 | Rincon et al. | |
| 2011/0139769 A1 | 6/2011 | Miller et al. | |
| 2014/0119813 A1 * | 5/2014 | Moselage, III | B29C 66/1122 403/270 |
| 2015/0274912 A1 | 10/2015 | Cavaliere et al. | |
| 2016/0147460 A1 | 5/2016 | Sohn et al. | |
| 2016/0159057 A1 * | 6/2016 | Butler | B29C 35/0288 156/285 |
| 2016/0214328 A1 * | 7/2016 | MacAdams | B29C 65/4835 |
| 2017/0274577 A1 * | 9/2017 | Burns | B29C 65/02 |

* cited by examiner

METHODS FOR MAKING COMPOSITE PARTS FROM STACKED PARTIALLY CURED SUBLAMINATE UNITS

BACKGROUND

This disclosure relates generally to methods for manufacturing composite structures and, more particularly, to methods for forming composite articles made of fiber-reinforced plastic material (e.g., pre-preg).

As used herein, the term "pre-preg" refers to a reinforcement material that has been impregnated with either a thermoplastic or thermoset polymeric matrix material, such as resin. The term "thermoset pre-preg" will be used to refer to reinforcement material that has been impregnated with thermoset resin. Pre-preg allows one to impregnate the fibers on a flat workable surface, or rather in an industrial process, and then later form the impregnated fibers to a shape which could prove to be problematic for the hot injection process. The thermoset pre-preg is only partially cured to allow easy handling; this B-stage material requires cold (below 20° C.) storage to prevent further curing. The pre-preg can be stored in a cooled area for an extended period of time to cure later.

Traditional methods of manufacturing thermoset composite articles include laying up composite plies of thermoset pre-preg over a forming die or tool. Heat and pressure are then applied to the composite layup to consolidate and cure the composite layup. In some traditional fabrication methods, the consolidation and curing of composite layups must be performed inside of an autoclave to provide the compaction pressure required to achieve the necessary mechanical properties for the cured composite article.

Traditional autoclave processing of thermoset composite materials may require extended periods of time during which heat and pressure are applied to a composite layup on a forming tool. For example, the consolidation and curing of a composite layup in an autoclave can take up to 24 hours. Unfortunately, autoclaves are generally expensive to construct and operate. Furthermore, the forming tools or dies over which the composite parts are laid up are relatively expensive to manufacture and maintain. For production programs requiring a high volume of thermoset composite parts, a large number of forming tools may be required. The combination of expensive forming tools and autoclave processing translates into an overall high cost of production.

The foregoing drawbacks are compounded by the fact that composites materials are capable of high degrees of optimization. Because individual plies of pre-preg used for primary structure are very thin (e.g., <0.01 inch), very complex stacking sequences are often developed for design to optimize strength and weight. However, high degrees of design complexity drive high manufacturing cost. Large/expensive automated layup equipment is needed because complex designs are created with thin material forms. In order to build up laminates fast with thin material, the machines need to be large and accurate. State-of-the-art high-performance thermoset pre-pregs also require large expensive autoclaves to consolidate and cure with high quality. Because of the nature of the materials used and the manufacturing process, many large expensive rate tools are often necessary to meet production rates for wing and fuselage structure.

In particular, the above-described problems are prevalent in aircraft manufacturing. Current composite wing and fuselage structures use very thin thermoset pre-preg material that requires very expensive automated fiber placement equipment. Moreover, the process of placing ply upon ply using a fiber placement machine takes days to build up a structure having a desired thickness and strength.

Improved methods for manufacturing thermoset composite parts that allow for high production rates with reduced manufacturing costs would be desirable.

SUMMARY

The subject matter disclosed in detail below is directed to methods for making composite parts from stacked partially cured (i.e., staged) sublaminate units made of composite material (e.g., fiber-reinforced plastic), each staged composite sublaminate being in the form of a sheet. The basic concept is to standardize composite pre-preg materials into sublaminate units of ten or more plies. These sublaminate units can be manufactured by a supplier and then sold in sheet form like sheet metal. During manufacture, each sublaminate unit would be consolidated and partially cured to 30-50% of full cure, stored and then shipped to a composite parts manufacturer, e.g., a manufacturer of aircraft components made of composite material. A stack of such sublaminate units may then be bonded together using adhesive and formed to have the shape of the final composite part while on a forming tool. During the bonding/forming operation, the stack of sublaminate units is heated to an intermediate temperature above a glass transition temperature of the resin for a time interval sufficient to intermediately cure the resin to an intermediate cure stage of 50% to 70% of full cure. Thereafter the resin in the composite laminate is finally cured at a final temperature higher than the intermediate temperature to a final cure stage. As used herein, the term "final cure stage" is not a synonym for "full cure". Many epoxy-based thermoset resins do not achieve 100% cure, i.e., degree of cure (DoC)=1.0. There is usually some residual reaction left over based on the cure temperatures used. Accordingly, the term "final cure stage" as used herein means greater than 90% of full cure.

Using the methodology described in the preceding paragraph, wing skin and fuselage designs can be simplified and built up as flat stacks and then formed into shape like metal-bonded structure. Having a larger unit thickness of the staged composite sublaminates would eliminate the need for large fiber placement equipment, freezers for pre-preg storage, and potentially autoclaves.

Although various embodiments of methods for making composite parts from stacked partially cured sublaminate units made of composite material in sheet form are described in some detail later herein, one or more of those embodiments may be characterized by one or more of the following aspects.

One aspect of the subject matter disclosed in detail hereinafter is a method of forming a composite article, comprising: (a) applying adhesive on surfaces of a plurality of sublaminate units, each sublaminate unit comprising a multiplicity of plies, each ply comprising fibers impregnated with resin which has been initially cured to an initial cure stage of 30% to 50% of full cure (i.e., DoC=0.30-0.50); (b) arranging the plurality of sublaminate units in a stack; (c) pressing the stack of sublaminate units against a surface of a forming tool; (d) heating the stack of sublaminate units to an intermediate temperature above a glass transition temperature of the resin for a time interval sufficient to intermediately cure the resin to an intermediate cure stage of 50% to 70% of full cure (i.e., DoC=0.50-0.70) while the stack is in contact with the surface of the forming tool to form a composite laminate having a contour defined by the surface of the forming tool; and (e) finally curing the resin in the composite laminate at a final temperature higher than the intermediate temperature to a final cure stage. Steps (c) and (d) are performed concurrently during a time interval. Each sublaminate unit of the plurality of sublaminate units is balanced and symmetric.

In accordance with one embodiment, the method described in the preceding paragraph further comprising: trimming at least one sublaminate unit of the plurality of sublaminate units prior to step (a); preparing a surface of at least one sublaminate unit of the plurality of sublaminate units prior to step (a); and drilling an index hole in each sublaminate unit of the plurality of sublaminate units prior to step (a). In accordance with this embodiment, step (b) comprises passing a pin through the index hole in each sublaminate unit of the plurality of sublaminate units.

In accordance with a further embodiment, the method further comprises: applying adhesive on a stiffener comprising a multiplicity of plies, each ply comprising fibers impregnated with resin which has been initially cured to an initial cure stage of 30% to 50% of full cure; and arranging the stiffener on top of the stack of sublaminate units.

Another aspect of the subject matter disclosed in detail hereinafter is a composite precursor comprising: a plurality of sublaminate units arranged in a stack, each sublaminate unit comprising a multiplicity of plies, each ply comprising fibers impregnated with resin which has been partially cured to a cure stage of 30% to 50% of full cure, and each ply having first and second holes which are aligned to form first and second longer holes that pass through the stack; first and second indexing pins disposed in the first and second longer holes respectively; and uncured adhesive disposed between each pair of adjacent sublaminate units arranged in the stack.

In accordance with some embodiments, the composite precursor described in the preceding paragraph further comprises: a stiffener in contact with a topmost sublaminate unit of the stack of sublaminate units; and uncured adhesive disposed between the stiffener and topmost sublaminate unit. Like the sublaminate units, the stiffener comprises a multiplicity of plies, each ply comprising fibers impregnated with resin which has been initially cured to an initial cure stage of 30% to 50% of full cure.

A further aspect of the subject matter disclosed in detail hereinafter is a method of forming a composite article, comprising: (a) arranging a plurality of sublaminate units in a stack with uncured adhesive between adjacent sublaminate units, each sublaminate unit comprising a multiplicity of plies, each ply comprising fibers impregnated with resin which has been initially cured to an initial cure stage of 30% to 50% of full cure (i.e., DoC=0.30-0.50); (b) heating the stack of sublaminate units to an intermediate temperature above a glass transition temperature of the resin for a time interval sufficient to intermediately cure the resin to an intermediate cure stage of 50% to 70% of full cure (i.e., DoC=0.50-0.70); (c) forming the heated stack of sublaminate units into a composite laminate having a surface defined by a surface of a forming tool; and (d) finally curing the resin in the composite laminate at a final temperature higher than the intermediate temperature to a final cure stage that is greater than 90% of full cure (i.e., DoC>0.90).

Other aspects of methods for making composite parts from stacked partially cured sublaminate units made of composite material in sheet form are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, a method for forming composite parts from partially cured composite sublaminate units will now be described in some detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the terms "ply direction" and "ply angle" are used synonymously and refer to the angle of parallel fibers in a ply, measured relative to a reference direction or axis. As used herein, the term "symmetric sublaminate" means a sublaminate in which for every ply above the sublaminate midplane, there is an identical ply (material and ply angle) an equal distance below the midplane. (Accordingly, as used herein, the term "unsymmetric sublaminate" means a sublaminate which is not a symmetric sublaminate.) As used herein, the term "balanced sublaminate" means a sublaminate in which for every ply having a +θ ply angle, there is another ply having a −θ ply angle somewhere in the laminate. This pair of plies having ply angles of ±θ need not be adjacent to each other.

Figure 1:
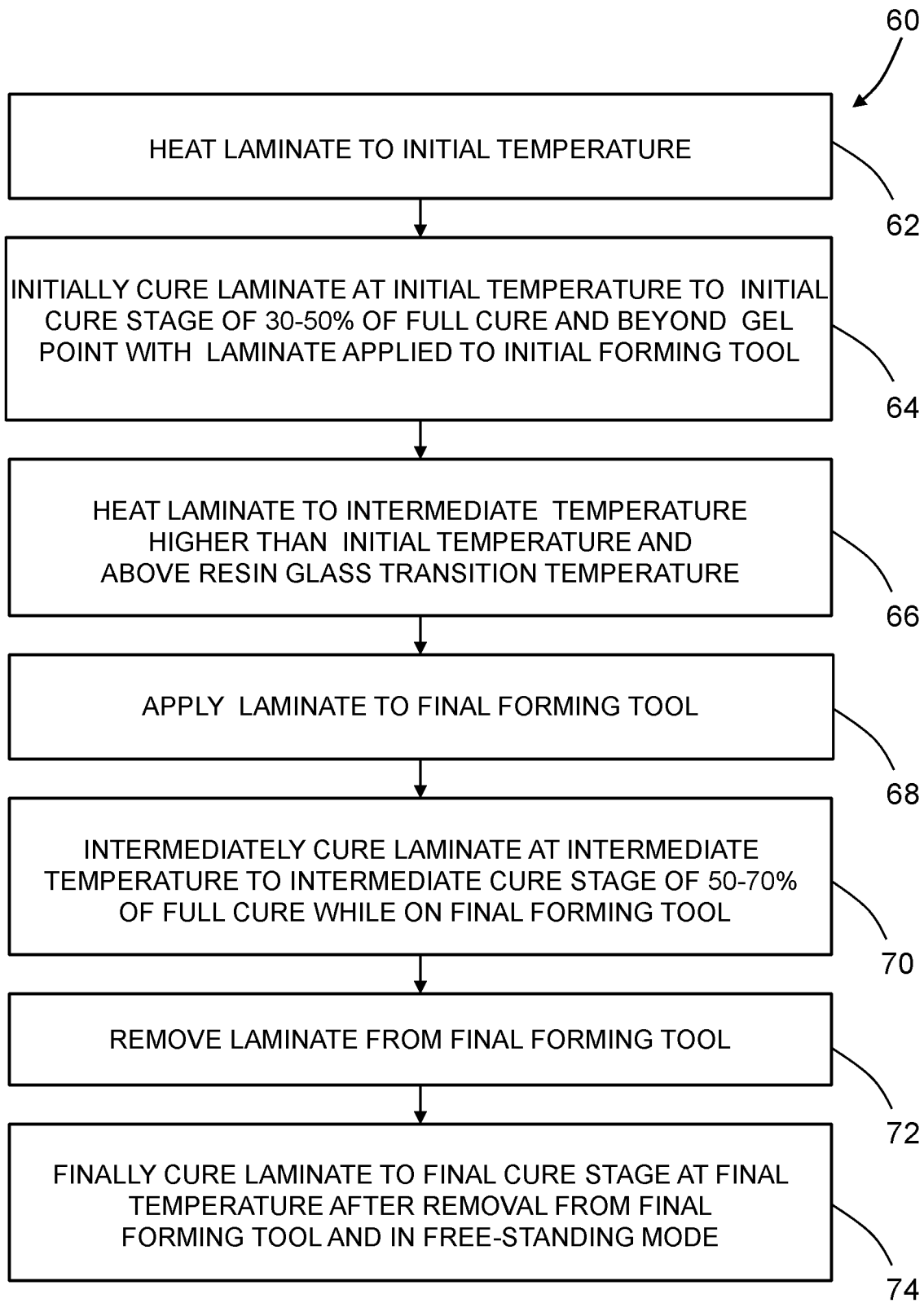
FIG. 1 is a flowchart that identifies some steps of a staged forming process for forming a composite part from thermoset composite materials.

FIG. 1 is a flowchart that identifies some operations of a staged forming process 60 for manufacturing a composite article from thermoset composite material. The composite material comprises a multiplicity of plies which are stacked to form a composite laminate. Each ply of the laminate may be a layer of fiber-reinforced thermoset resin material. In accordance with one embodiment, the staged forming process 60 comprises the following steps: heating the composite laminate to an initial temperature (step 62); initially curing the composite laminate at the initial temperature to an initial cure stage of 30-50% of full cure and beyond the gel point while the composite laminate is applied to an initial forming tool to form an initially cured composite laminate (step 64); heating the initially cured composite laminate to an intermediate temperature higher than the initial temperature and above the glass transition temperature of the resin in the composite laminate (step 66); applying the initially cured composite laminate to a final forming tool and forming the composite laminate to have a final contour at the intermediate temperature (step 68); intermediately curing the initially cured composite laminate at the intermediate temperature to an the intermediate cure stage of 50-70% of full cure while the composite laminate is applied to the final forming tool to form an intermediately cured composite laminate (step 70); removing the intermediately cured composite laminate from the final forming tool (step 72); and finally curing the intermediately cured composite laminate at a final temperature to a final cure stage after removal from the final forming tool and in a free-standing mode (step 74). Alternatively, the intermediately cured composite laminate can be finally cured at a final temperature to a final cure stage while still applied to the final forming tool.

Figure 2:
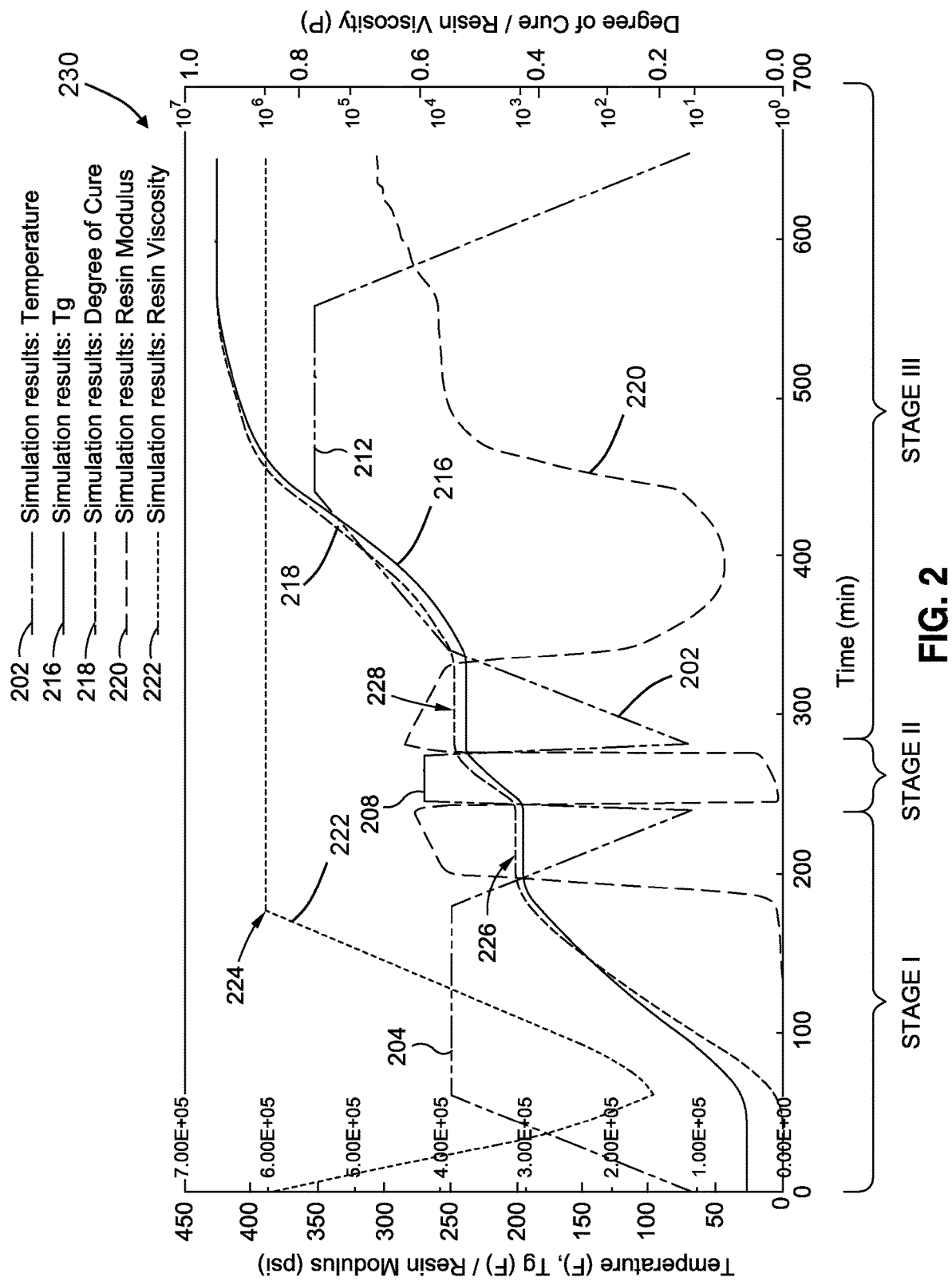
FIG. 2 is a graph plotting various processing parameters versus time for the method of forming a composite article illustrated in FIG. 1.

FIG. 2 is a graph plotting various resin properties versus time in a computer simulation of an example of a staged process for forming a thermoset composite article according to the method illustrated in FIG. 1 using an epoxy-based resin system designated as Cycom™ 5320-1, which was commercially available from Cytec Engineering of Woodland Park, N.J. FIG. 2 illustrates the cure kinetics and the property development of the resin during the staged process of forming a composite article. As indicated in the legend shown in the upper right-hand corner of FIG. 2, the temperature of the resin is represented by a line 202 in which very long dashes alternate with pairs of short dashes; the resin glass transition temperature $T_g$ is represented by a solid line 216; the degree of cure of the resin is represented by a dashed line 218 comprising short dashes; the resin modulus is represented by a dashed line 220 comprising medium-length dashes; and the resin viscosity is represented by a dashed line 222 comprising very short dashes.

The glass transition temperature of an epoxy is the temperature range where the thermosetting polymer transitions from a hard glassy material to a more pliable rubbery material. Because epoxies are thermosetting materials and chemically cross-link during the curing process, the final cured epoxy material does not melt or reflow when heated (unlike thermoplastic materials), but undergoes a slight softening (phase change) at elevated temperatures. The glass transition temperature is not a discrete thermodynamic transition, but occurs over a temperature range. The convention, however, is to report a single temperature defined as the midpoint of the temperature range. The glass transition temperature value can also vary depending on its degree of cure. Usually the reported glass transition temperature for a material is based on a 100% degree of cure (i.e., full cure).

FIG. 2 illustrates the changes in the resin parameters during the simulation of the staged forming and curing process shown in FIG. 1. During the first stage of the simulation, the temperature of the resin was is increased to an initial temperature 204 and held at that initial temperature for an initial dwell time, followed by a gradual reduction or removal of heat. Also shown is the gradual increase in resin glass transition temperature (see line 216) and gradual increase in the degree of cure (see line 218) which correspond to the increase to the initial temperature 204 of the resin and the initial dwell time at that initial temperature 204. In addition, FIG. 2 shows an initially gradual reduction and subsequent gradual increase in the resin viscosity (see line 222) as the temperature of the resin increased and was held at the initial temperature 204 during the initial dwell time. The initial temperature 204 was selected so that the resin state would reach at least beyond its gel point 224. The gel point 224 may be described as the point at which cross-linking of the thermoset polymer transitions the resin from a liquid state to a solid state such that the resin no longer flows. For the epoxy-based resin system that was simulated, the temperature of the resin was increased from room temperature to an initial temperature 204 of 250° F. and held there for an initial dwell time of approximately 2 hours during the initial cure stage 226, after which the temperature of the initially cured resin was allowed to reduce down to its original temperature (e.g., room temperature), resulting in the initially resin being partially cured to approximately 40% of full cure.

In the simulation, the resin was then heated to an intermediate temperature 208 of 270° F. The resin temperature was increased at a relatively high rate above the resin glass transition temperature 216 and held at that intermediate temperature for about 50 minutes. At the intermediate temperature 208, the resin partially cured to an intermediate cure stage 228, resulting in an intermediately cured resin that was partially cured to more than 50% of full cure. The increase in temperature of the epoxy-based resin system from the original temperature (e.g., room temperature) to the intermediate temperature 208 results in a sudden decrease in the resin modulus (see line 220), which corresponds to softening of the resin. The intermediate dwell time during which the resin is held at the intermediate temperature 208 may be limited to the amount of time necessary to advance the resin to 50-70% of full cure. For example, FIG. 2 illustrates a relatively short final dwell time of less than 1 hour, which resulted in a partial cure of about 55%.

Finally, in the simulation described above, the intermediately cured resin was then heated at a relatively slow heating rate up to a final temperature 212 of 350° F., after which the resin was held at the final temperature 212 for a predetermined final dwell time. At the final temperature 212, the resin finally cured to a final cure stage 230, resulting in a fully cured resin. As seen in FIG. 2, the increase to the final temperature 212 resulted in an increase in the cure level from the intermediate cure stage 228 to the final cure stage 230 with a corresponding increase in the resin modulus (see line 220) and glass transition temperature (see line 216).

Figure 3:
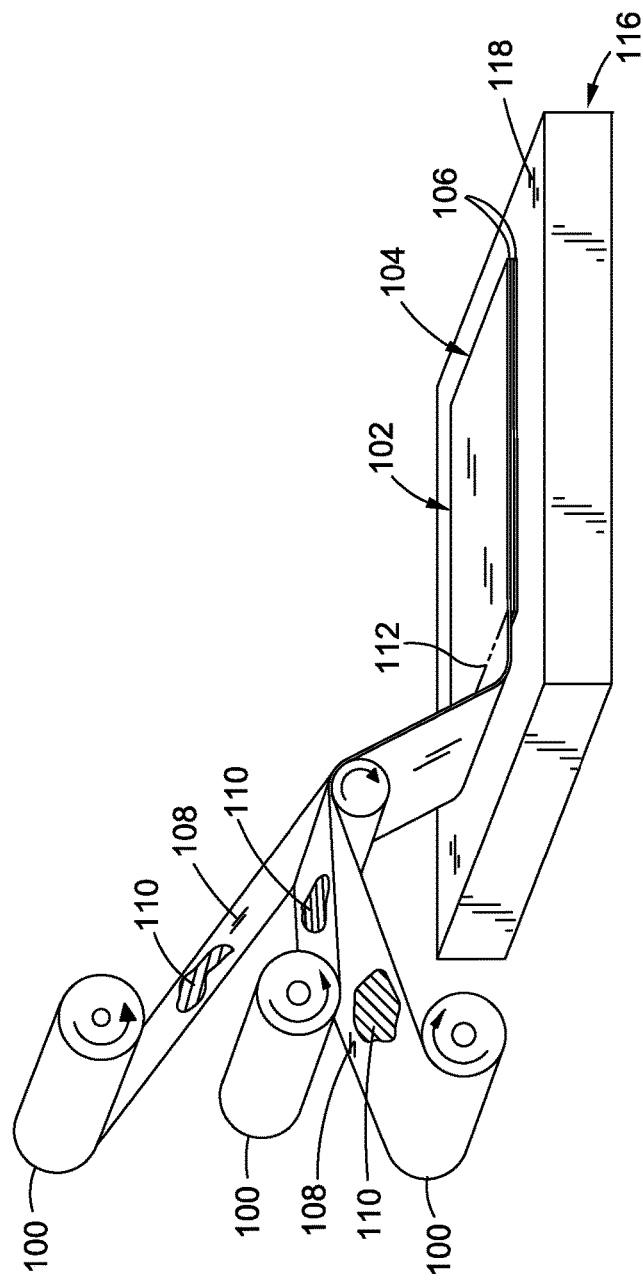
FIG. 3 is a diagram representing a view of a layup of a composite laminate from one or more rolls of composite material.

FIG. 3 is a diagram representing a view of a layup 104 of a composite material 100 dispensed from multiple rolls. The composite material 100 may be a fiber-reinforced thermoset resin material. The layup 104 is initially consolidated and cured on a low-cost (e.g., flat) initial forming tool 116 (FIG. 3) to form a thermoset composite laminate 102. In the example depicted in FIG. 3, the composite material 100 comprises a multiplicity of plies 106 of composite material, such as thermoset pre-preg. Each ply 106 may include organized tows of structural reinforcing fibers 110 embedded in resin 108. The fibers 110 may be arranged in any one of a variety of different configurations and/or fiber orientations (e.g., 0, 22.5, 30, 45, 60, 75, 90 degrees or other fiber angles). For example, the fibers 110 may be oriented unidirectionally or in a bidirectional arrangement. Alternatively, the composite material 100 may be provided as multi-axial fabric, woven fabric, braided fabric, warp-knit fabric, chopped fiber mats, or any one of a variety of other fiber configurations. The fibers 110 may be made of a material selected from the groups disclosed in U.S. Pat. No. 9,539,767, including aramids, polyolefins, metal, glass, carbon, boron, ceramic, mineral, and any one of a variety of other materials or combination of materials.

The resin 108 may be applied to the fibers 110 such that the fibers 110 are pre-impregnated (i.e., pre-preg) within the resin 108 or the resin 108 may be applied after laying up dry fiber composite plies (not shown). The resin 108 may be provided in a desired amount to provide the desired fiber volume fraction of the final composite article. The resin 108 may have a material composition selected from the following groups: acrylics, epoxies, fluorocarbons, polyamides, polyethylenes, polyesters, poly-propylenes, polycarbonates, polyurethanes, polyetheretherketones, polyetherketone-ketones, polyetherimides, and other material compositions. As an alternative to pre-preg composite material, the method may include laying up one or more dry fiber composite plies into a stacked formation (not shown), and infusing the dry fiber stacked with resin using any one of a variety of resin infusion processes such as resin film infusion or a liquid resin infusion process such as a vacuum-assisted process.

As seen in FIG. 3, the composite material 100 may be laid up as one or more composite plies 106 and trimmed along a trim line 112 to form a composite layup 104. For example, multiple plies 106 of thermoset pre-preg may be laid up on a flat layup table (not shown). Alternatively, multiple plies 106 of thermoset pre-preg may be laid up on initial forming tool 116 as shown in FIG. 3. Advantageously, the initial forming tool 116 may be provided as a simple and relatively low-cost tool having a flat tooling surface 118. The flat initial forming tool 116 may be used to form the composite layup 104 prior to consolidating and initially curing the composite laminate 102.

The plies 106 of composite material may be stacked according to a predetermined stacking sequence to achieve the desired strength, stiffness, and other mechanical properties of the final composite article. In one example, the method may include laying up the composite laminate 102 as a quasi-isotropic laminate containing 0, ±45, and 90 degree plies prior to initially curing the composite laminate 102. Alternatively, as mentioned above, the method may include laying up multiple plies of dry fiber, and infusing the fibers with resin to form the composite laminate 102. A composite laminate 102 may be laid up of pre-preg composite material 100 or of dry fiber composite material to form a constant-thickness laminate. In some examples, a composite laminate 102 may be laid up, consolidated, and partially cured as a flat panel 114 (FIG. 3) in standardized gauges or thicknesses such as a three-ply laminate, a five-ply laminate, a ten-ply laminate, or any other laminate thickness.

Figure 4:
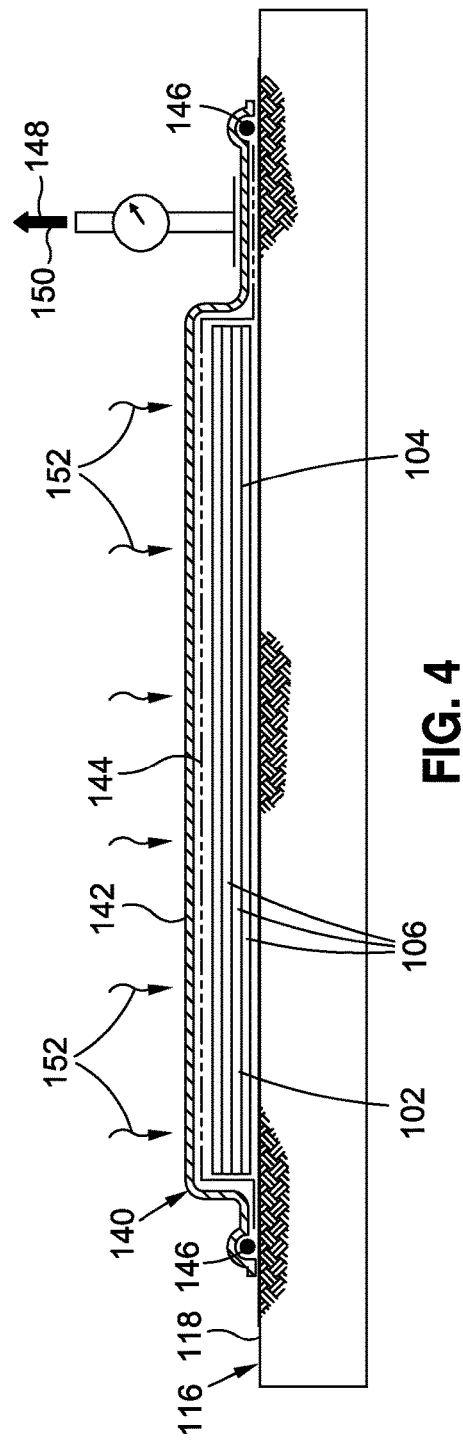
FIG. 4 is a diagram representing a sectional view of a composite laminate that is being heated while under vacuum bag pressure.

FIG. 4 shows the initial curing of the thermoset composite laminate 102 on the initial forming tool 116 under vacuum bag pressure at an initial temperature 204 beyond the gel point 224 (shown in FIG. 2) of the resin. The composite laminate 102 is covered by a bagging assembly 140 comprising a bagging film 142 which is sealed along the perimeter edges of the film using an edge sealant 146. The bagging assembly 140 further comprises a breather layer 144 to facilitate a substantially uniform application of vacuum pressure 148 (indicated by an upward pointing arrow in FIG. 4) to consolidate the composite laminate 102 against the flat tooling surface 118 of the initial forming tool 116. Additional layers (not shown in FIG. 4) may be included in the bagging assembly 140, such as a release layer for removal of the bagging assembly 140 from the composite laminate 102, and a release coat or film which may be applied to the flat tooling surface 118 prior to laying up the composite plies 106. A vacuum pressure 148 may be applied to the bagging film 142 by a vacuum source (not shown in FIG. 4), such as a vacuum pump, to apply compaction pressure for consolidating the composite laminate 102. Although the composite laminate is vacuum-bagged in FIG. 4, consolidation may be performed using other means for applying compaction pressure. including, but not limited to, a mechanical press, a caul plate, or other compaction means.

During consolidation and cure, heat 152 (see FIG. 4) is applied to the composite laminate 102 by any one of a variety of different heating mechanisms to elevate the temperature of the composite laminate 102 to the initial temperature 204 and maintain the initial temperature 204 for a desired initial dwell time (see FIG. 2). Heat 152 may be applied by a heating device such as an oven, an autoclave, a heating blanket, or by other means including, but not limited to, radiation heating, convection heating, conduction heating, forced-air heating, heated tooling, or by other means.

Figure 5:
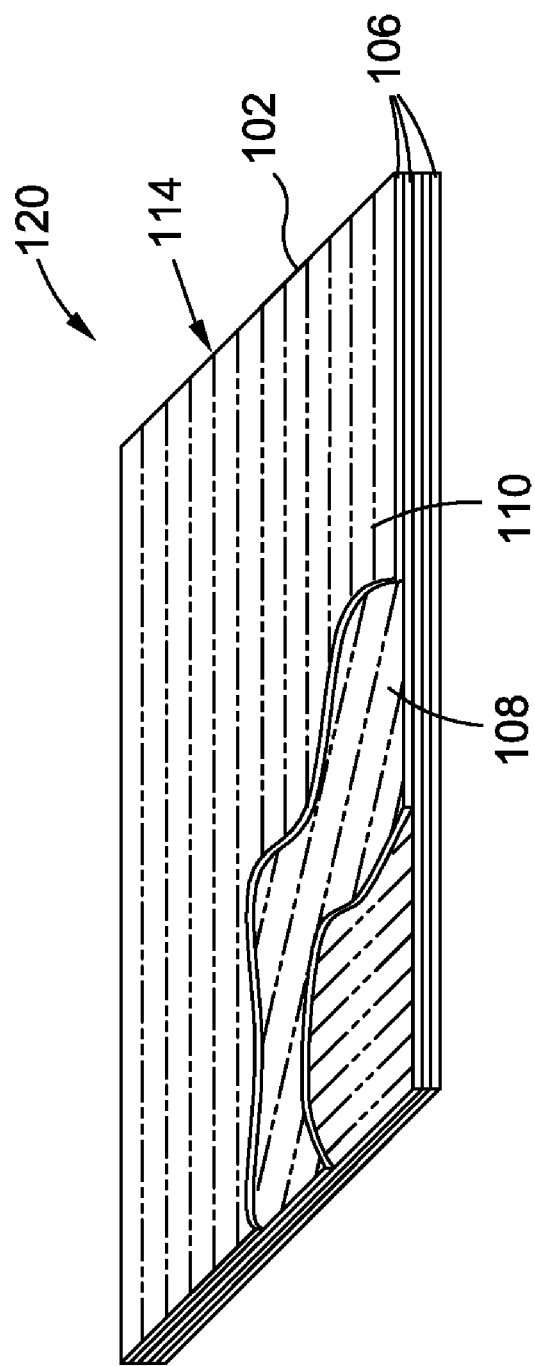
FIG. 5 is a diagram representing a view of an initially cured composite laminate.

As indicated above, heat 152 may be applied to increase the temperature of the composite laminate 102 to the initial temperature 204 to cure the composite laminate 102 to an initial cure stage 226 of 30-50 percent of full cure and at least beyond the gel point 224 to form an initially cured composite laminate 120 into a flat panel 114, shown in FIG. 5. Advantageously, curing of the composite laminate 102 to an initial cure stage 226 of between approximately 30-50% of full cure and at least beyond the gel point 224 may allow the initially cured composite laminate 120 to be stored at room temperature, and thereby avoiding the traditional requirement of storing pre-preg materials at relatively cold temperatures (e.g., at 0° F. or colder) to maintain the shelf life of the pre-preg. In this regard, the initially cured composite laminate 120 may be stored in a relatively low-humidity environment or humidity-controlled environment (e.g., a plastic bag) without the need for refrigeration. The initially cured composite laminate 120 may optionally be stored in a UV-protected environment, such as a black nylon bag, to extend the shelf life of the initially cured composite laminate 120.

In the following portions of this disclosure, a composite laminate in the form of a sheet or panel will be referred to as a "sublaminate unit". Such sublaminate units can be stacked, formed and cured to form a finished composite article (e.g., a wing of an aircraft). Designing and building a composite structure using relatively thicker sublaminate units in the form of sheets which are stacked and then formed at a temperature above the resin glass transition temperature would simplify the design and allow the use of cheaper pick-and-place robotic equipment, which would reduce manufacturing cost. Using thicker sublaminate units could provide an order of magnitude faster build-up of structure in a composite wing or fuselage factory since the material would come in pre-consolidated form (i.e., with reduced porosity).

Rather than buying uncured thin pre-preg, families of partially cured sublaminates of desired stacking and gauge can be developed for purchase by composite parts manufacturers. Such sublaminate families could be standardized to provide a relatively small number of sublaminate families and gauges. These sublaminate units in sheet form can be purchased in a pre-consolidated and partially cured state from a material supplier. Optimally, composite sublaminates staged to 30% to 50% cured will be very stable at room temperature for long periods of time and have reduced porosity. Upon heating a stack of sublaminates above the resin glass transition temperature, the laminate will become highly formable without resin flow.

In accordance with various embodiments, the unit thickness for design could be 0.075 to 0.150 inch for each sublaminate family. A thick wing skin could be built up using staged sublaminates with ten to twenty pick-and-place operations versus one hundred to two hundred ply sequences as with traditional layup equipment.

The sublaminate units can be assembled to form a laminate by stacking a plurality of units on a flat tool (e.g., a layup table) with adhesive interleaved with the sublaminate units in an alternating sequence and then envelope bagging the stack for a vacuum double-diaphragm forming or press operation over a forming tool having a surface that defines a wing or fuselage contour. This process would be akin to metal-bond processing, but with staged pre-preg sublaminates instead.

Such a process has the following benefits: (a) large automated layup machines could be eliminated from the factory; (b) large autoclaves could be eliminated from the factory; (c) freezers could be eliminated for the storage of pre-preg; (d) the pre-preg system could be commoditized into a form that would also force design simplification; (e) the material can be supplied in a pre-consolidated sheet form similar to sheet metal; and (f) a structural pre-preg can be processed more like a thermoplastic or sheet metal, but at lower temperatures and pressures.

Figure 6:
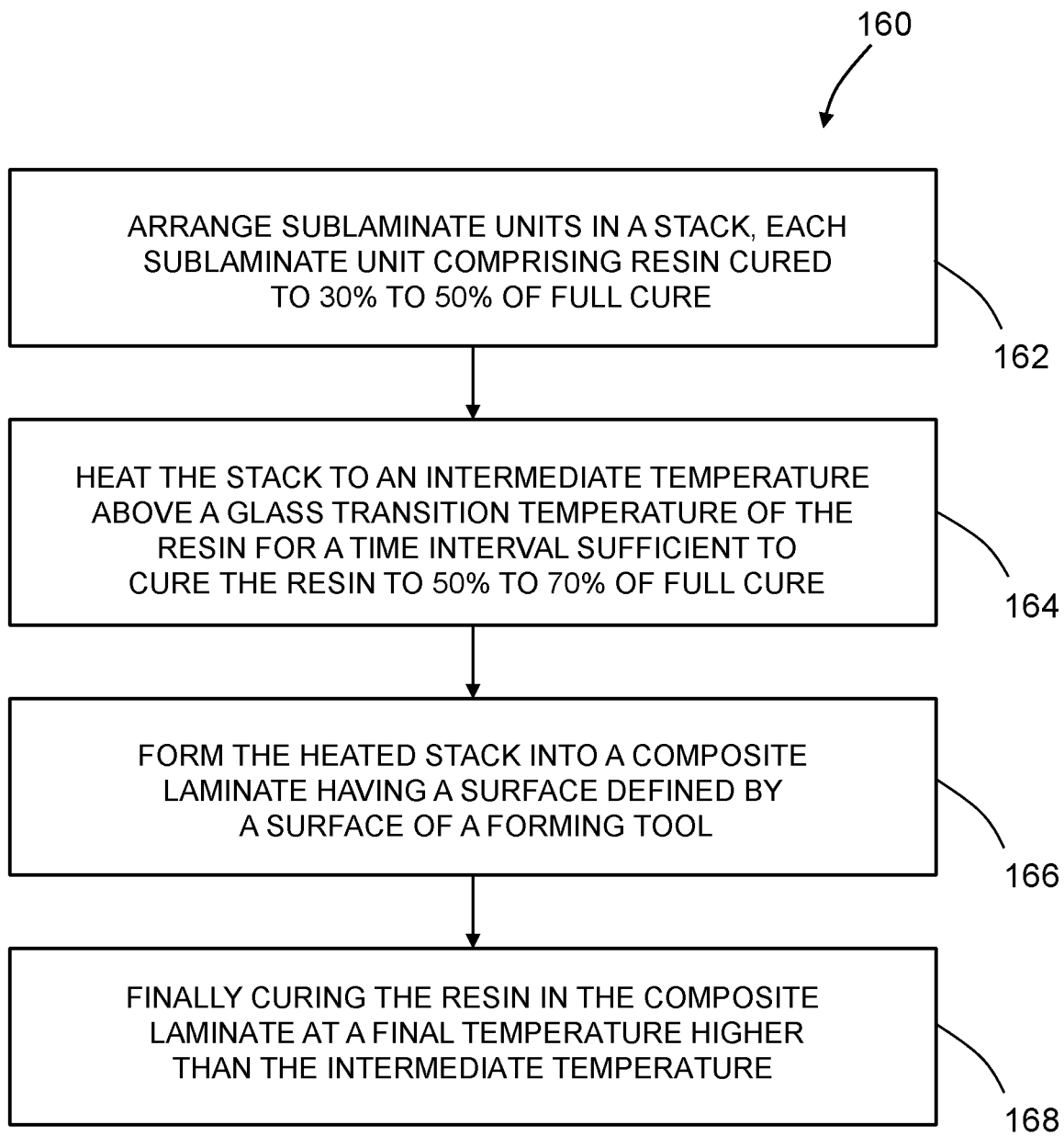
FIG. 6 is a flowchart identifying some steps of a method for making composite parts from stacked partially cured sublaminate units made of composite material in sheet form in accordance with one embodiment.

In accordance with one proposed embodiment, a basic process 160 for forming a composite part using staged thermoset stacked sublaminate units comprises the steps identified in the flowchart of FIG. 6. First, a plurality of sublaminate units are arranged in a stack with uncured adhesive between adjacent sublaminate units (step 162). Each sublaminate unit comprises a multiplicity of plies; each ply comprises fibers impregnated with resin which has been initially cured to an initial cure stage of 30% to 50% of full cure. Then the stack of sublaminate units are heated to an intermediate temperature above a glass transition temperature of the resin for a time interval sufficient to intermediately cure the resin to an intermediate cure stage of 50% to 70% of full cure (step 164). The heated stack of sublaminate units is formed into a composite laminate having a surface defined by a surface of a forming tool (step 166). Then the resin in the composite laminate is finally cured at a final temperature higher than the intermediate temperature to a final cure stage (step 168). Many of epoxy-based thermoset resins do not achieve 100% cure (hereinafter "full cure"). There is usually some residual reaction left over based on the cure temperature used. As used herein, the term "final cure" means a final cure stage greater than 90% of full cure.

Figure 7:
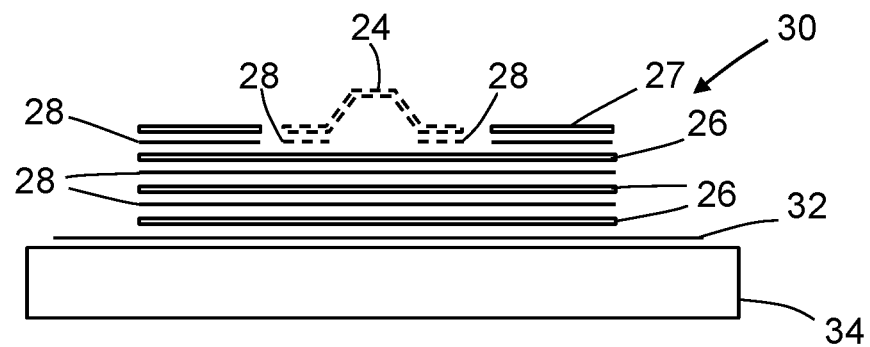
FIG. 7 is a diagram representing an exploded side view of a stack of staged sublaminate units and adhesive on a flat surface of a layup tool. An optional stiffener is shown in dashed lines.

FIG. 7 is a diagram representing an exploded side view of a stack 30 of staged (i.e., partially cured) sublaminate units 27, 28 and adhesive 26 on a flat surface of a layup tool 34. A sheet of plastic bagging film 32 (e.g., made of nylon) is placed between the stack 30 and the layup tool 34. In this example, the stack 30 comprises three sublaminate units 26 laid on top of each other and having the same length and a pair of sublaminate units 27 of relatively shorter length laid on top of the uppermost sublaminate units 26. Layers of adhesive 28 are interleaved between the stacked sublaminate units 26, 27. Each sublaminate unit 27, 28 comprises a multiplicity of plies. Each ply comprises fibers impregnated with resin which has been initially cured to an initial cure stage of 30% to 50% of full cure. Initially the adhesive 28 is uncured.

The simple example depicted in FIG. 7, in which the stack 30 has only four layers, is provided for the purpose of illustration. The stack 30 may include any number of sublaminate units 26 and any number of sublaminate units 27. Optionally, one or more preformed straight stiffeners—such as the stiffener 24 (having a hat-shaped profile or some other profile) indicated by dashed lines in FIG. 7—can be added to the stack 30 with intervening layers of adhesive 28 (also indicated by dashed lines in FIG. 7). In this case the stiffeners are also pre-consolidated and staged under pressure (e.g., 90 psi) with temperature for a sufficient time (past gelation) to achieve an initial cure equal to 30% to 50% of full cure. A flexible mandrel may be used. Optionally, filler plies may be placed where the thicker sublaminate steps to make smooth transitions for the stiffeners. It is possible that the stiffeners could be fully un-cured, combining the co-bonding green stringers to the staged forming of the sub-laminates.

Figure 8:
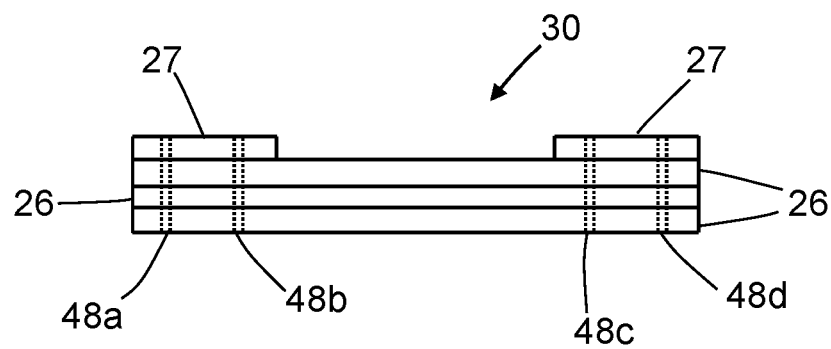
FIG. 8 is a diagram representing a side view of a stack of staged sublaminate units and adhesive indexed on a flat surface of a layup tool using indexing pins.

As shown in FIG. 8, each of the sublaminate units 26, 27 has holes for receiving indexing pins 48a-48d (indicated by respective pairs of parallel dashed lines). The indexing pins 48a-48d ensure that the sublaminate units 26, 27 are properly aligned during stacking. In the example depicted in FIG. 8, each of the sublaminate units 28 of stack 30 has four holes for receiving respective indexing pins 48a-48d, whereas one sublaminate unit 27 has two holes for receiving respective indexing pins 48a and 48b, while the other sublaminate unit 27 has two holes for receiving respective indexing pins 48c and 48d. In the absence of the sublaminate units 27, the sublaminate units 28 could be aligned using only two indexing pins instead of four. The ends of the indexing pins 48a-48d may be inserted in receiving holes formed in the layup tool 34.

Figure 9:
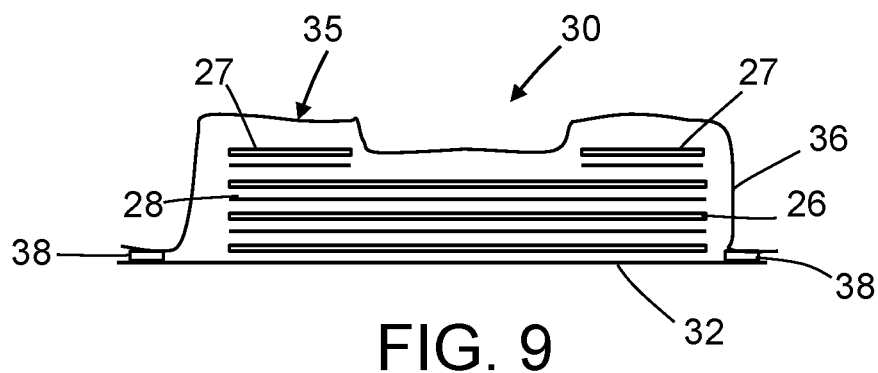
FIG. 9 is a diagram representing an exploded side view of the stack depicted in FIG. 7 after the stack has been enveloped in an inner vacuum bag.

The stack 30 is then covered by an intermediate bagging film 36, which is sealed to the underlying lower bagging film 32 by a perimeter seal 38 (e.g., sealant tape) to form an inner vacuum bag 35. The intermediate bagging film 36 may be made of nylon or other suitable plastic material. FIG. 9 is a diagram representing an exploded side view of the stack 30 depicted in FIG. 7 after the stack 30 has been enveloped in the inner vacuum bag 35.

A vacuum pressure is then applied to the space inside the inner vacuum bag 35, causing that space to be at least partially evacuated. Air evacuation between the sublaminate units 26, 27 ensures contact with the adhesive 28 and maintains the indexing. The inner vacuum bag 35 would also contain any breather materials and prevent any adhesive 28 from flowing onto the final forming tool 44 (see FIG. 10).

Figure 10:
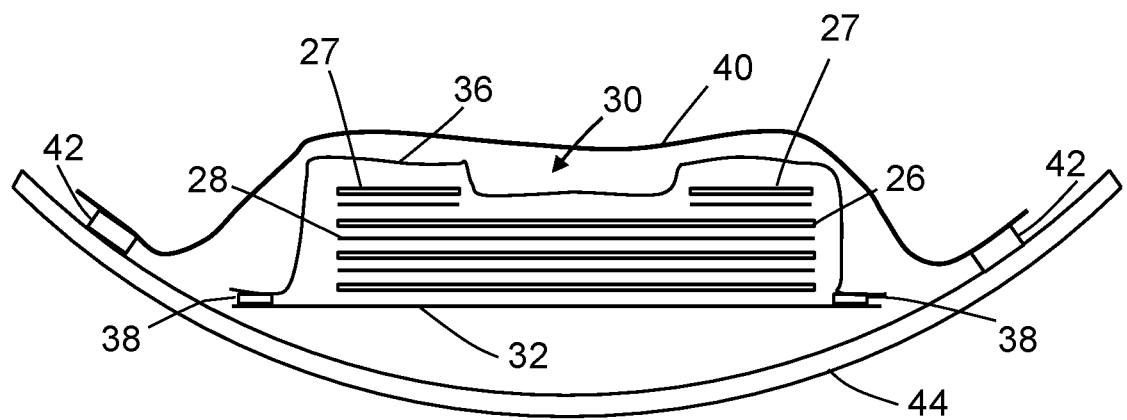
FIG. 10 is a diagram representing an exploded side view of the enveloped stack depicted in FIG. 9 situated on a final forming tool with an outer vacuum bag draped over the inner vacuum bag and sealed to the final forming tool. The stack is shown in an unformed state to represent the start of forming.

FIG. 10 is a diagram representing an exploded side view of the enveloped stack 30 (depicted in FIG. 8) situated on a final forming tool 44 that has a forming surface with the desired contour. An upper bagging film 40 is draped over the enveloped stack 30 and sealed to the final forming tool 44 by a perimeter seal 42 (e.g., made of sealant tape). This upper bagging film 40 is frequently referred to as an "outer vacuum bag". The stack 30 is shown in FIG. 10 in an undeformed state to represent the forming process has not yet begun.

The final forming tool 44 with stack 30 thereon is then shuttled into an oven in which the temperature (hereinafter "intermediate temperature") is above a glass transition temperature of the resin. The stack 30 is heated to that intermediate temperature for a time interval sufficient to intermediately cure the resin to an intermediate cure stage of 50% to 70% of full cure, as previously described. In accordance with one proposed implementation, the intermediate temperature is approximately 250° F. The glass transition temperature will vary depending on the particular resin used.

Figure 11:
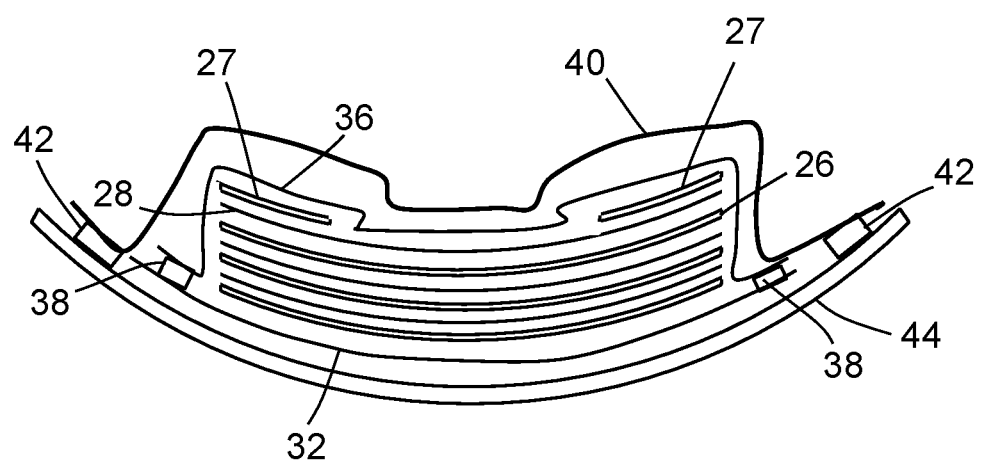
FIG. 11 is a diagram representing an exploded side view of the arrangement depicted in FIG. 10 after forming.

Once the resin in the stack 30 reaches the intermediate temperature, the sealed space underneath the upper bagging film 40 is subjected to vacuum pressure for the purpose of exerting a pressure that urges the stack 30 against the final forming tool 44. FIG. 11 is a diagram representing an exploded side view of the arrangement depicted in FIG. 10 after the forming has been completed. It can be seen that the stack 30 has been deformed to conform to the shape of the final forming tool 44. In alternative embodiments, instead of using an outer vacuum bag, pressure can be applied using mechanical means. For example, a pressurized inflatable bladder could be used.

After the stack 30 has been formed to the desired shape, the stack 30 is subjected to a final temperature higher than the intermediate temperature for the purpose of achieving a final cure of the resin equal to at least 90% of full cure. In accordance with one embodiment, that final temperature is 355° F. However, the temperature needed to achieve a final cure equal to 90% of full cure will vary as a function of the particular resin material used.

Figure 12:
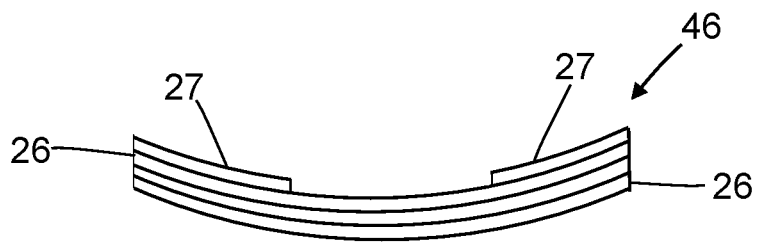
FIG. 12 is a diagram representing a side view of the finished composite part.

FIG. 12 is a diagram representing a side view of the finished composite part 46 comprising a fully cured lamination of sublaminate units 26, 27. After sufficient cooling has occurred, the composite part 46 can be incorporated in an apparatus or vehicle (e.g., an aircraft) during assembly. Alternatively, the composite part 46 can be stored in inventory.

Figure 13:
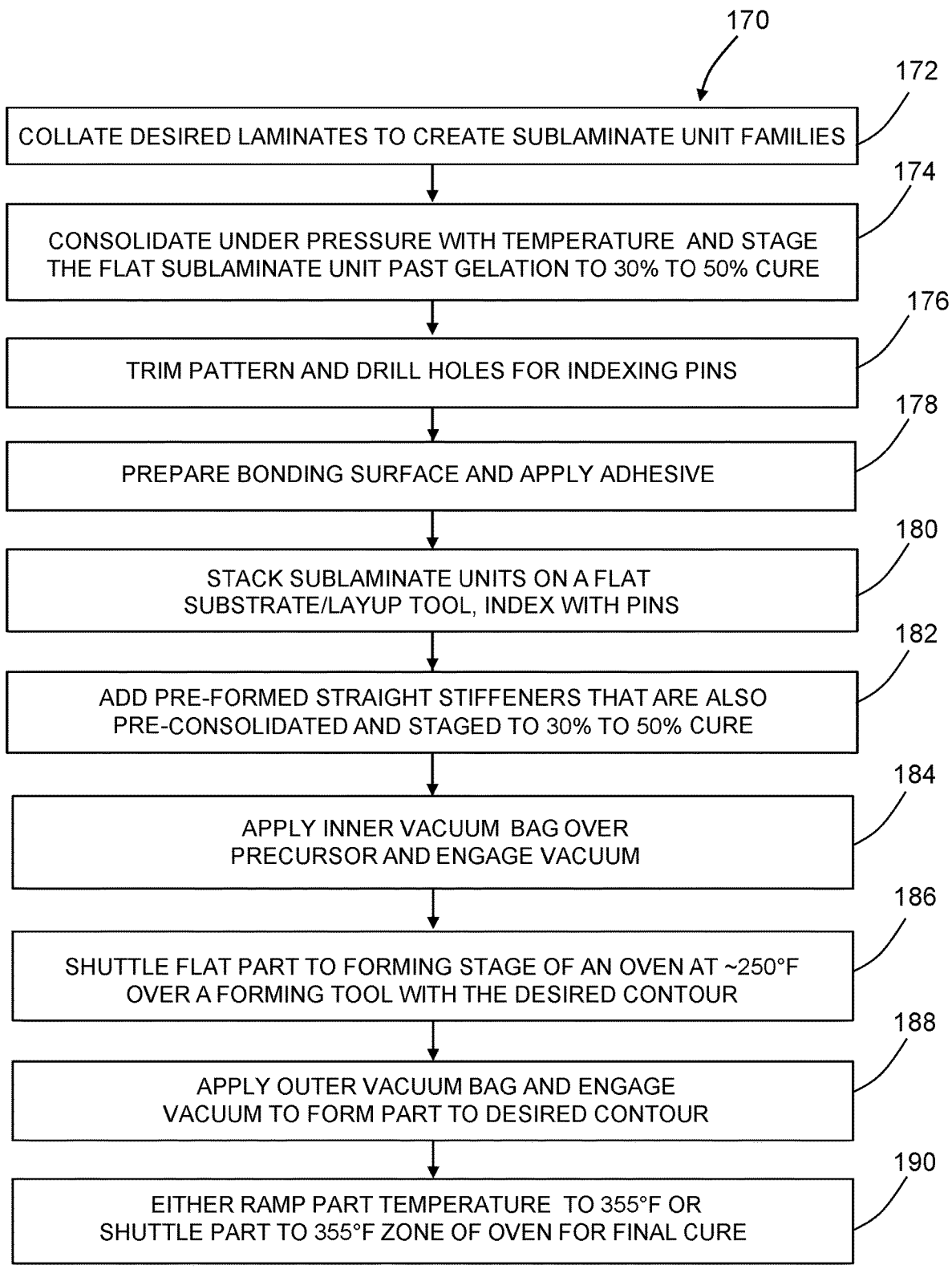
FIG. 13 is a flowchart identifying some steps of a method for making composite parts from stacked partially cured sublaminate units made of composite material in sheet form in accordance with one proposed implementation.

FIG. 13 is a flowchart identifying some steps of a method 170 for making composite parts from stacked partially cured sublaminate units made of composite material in sheet form in accordance with one proposed implementation in which Toray 3900-2 epoxy (commercially available from Toray Composite Materials America, Inc.) is used. The method 170 comprises the following steps:

The first two steps can be performed by a material supplier. First, desired sublaminates (each having n plies) are collated to create sublaminate unit families. For example, different families may have sequences of plies having 0°/±45°/90° ply directions (i.e., fiber orientations) of the following example percentages: 30/60/10, 50/40/10, or 25/50/25, arranged in ten-ply to twenty-ply sublaminate units (the number of plies may be greater than twenty) which are both balanced and symmetric (step 172 in FIG. 13). Second, each flat sublaminate unit is consolidated under pressure (e.g., 90 psi) with temperature for a sufficient time (e.g., several hours) to pass the gelation point. This can achieve an initial cure equal to 30% to 50% of full cure (steps 174). For some resins, the initial cure can occur when the sublaminate unit is heated to a glass transition temperature $T_g$ of 200° F. to 220° F.

After the initial cure, the sublaminate units are cooled and ready for storage or shipment. The initially cured sublaminate units can be shipped flat or on large radius rolls of desired width and length. Each sublaminate unit will be porosity free and will no longer need freezer storage. Only protection against moisture and ultraviolet radiation should be provided. Steps 172 and 174 can occur at the material supplier, thereby eliminating the need for large layup equipment and potentially eliminating the need for autoclaves in the factory.

After the shipment has been received at the factory, the manufacturer would typically trim the pattern for each staged sublaminate unit with a router or water jet, including drilling holes for indexing pins in each sublaminate unit (steps 176). Then the bonding surfaces are prepared (e.g., by sanding, grit blasting, peel-ply removal, or plasma treatment) and adhesive is applied (steps 178). The adhesive may be applied in the form of a film or paste or may be liquefied and sprayed on. A pick-and-place machine is then used to stack the individual sublaminate units on a flat substrate or tool (e.g., a layup table), each sublaminate unit being indexed with nylon or Teflon pins (steps 180).

Optionally, preformed straight stiffeners can be added to the stack (step 182). In this case the stiffeners are also pre-consolidated and staged under pressure (e.g., 90 psi) with temperature for a sufficient time (past gelation) to achieve an initial cure equal to 30% to 50% of full cure. As previously mentioned, for some resins the initial cure can occur when the sublaminate unit is heated to a glass transition temperature $T_g$ of 200° F. to 220° F. The inclusion of stiffeners would involve the use of flexible mandrels. It is also likely that filler plies would be included where the thicker sublaminate steps to make smooth transitions for the stiffeners (a.k.a. stringers). It is also possible that the stringers could be fully uncured, combining the co-bonding green stringers to the staged forming of the sublaminate units.

The stack 30 (with or without stiffeners) constitutes a composite precursor that is then enveloped in an inner vacuum bag 35, following which a vacuum pressure is applied (steps 184). This results in partial evacuation of the sealed space surrounding the stack 30 and inside the inner vacuum bag 35. Thereafter, the flat composite precursor is placed on a final forming tool 44 and shuttled into an oven at an intermediate temperature (i.e., forming temperature) of ~250° F. for a sufficient period of time to produce an intermediate cure equal to 50% to 70% of final cure. Once the resin in the stack 30 reaches the intermediate (i.e., forming) temperature (i.e., past gelation), the sealed space underneath the upper bagging film 40 is subjected to a vacuum pressure that presses the softened stack 30 to conform to the contour of the final forming tool 44 (step 188).

Laminates staged past gelation will re-soften when the glass transition temperature $T_g$ is crossed and will form easily without re-flowing. The process will be like metal-bonding and thermoplastic forming with less pressure required. There will not be a secondary drop in the resin viscosity, so no additional flow will occur. Gelation happens at different degrees of cure for different resin chemistries. So in choosing the desired staging degree of cure for the sublaminate material, one must understand how much cure is required to get past the gelation point.

The glass transition temperature of a thermo-set resin is a function of the degree of cure. It is not fixed until the cure is complete. The methodology disclosed herein takes advantage of the fact that the partially cured resin will have a lower glass transition temperature $T_g$ when partially cured. When the composite precursor is reheated and crosses the glass transition temperature $T_g$, the resin material will soften. Then as the cure continues, the glass transition temperature $T_g$ will advance to the final cure state.

After the stack 30 has been formed to the desired shape, the stack 30 is subjected to a final temperature higher than the intermediate temperature for the purpose of achieving a final cure of the resin equal to at least 90% of full cure (step 190). This can be accomplished either by ramping the part temperature to a final cure temperature (e.g., 355° F.) or by shuttling the formed composite part 46 to a different zone of the oven having a temperature equal to the final cure temperature.

For the purpose of completeness, a typical method for evacuating a sealed space underneath a vacuum bag for curing a composite part on a tool will now be described with reference to FIG. 14.

Figure 14:
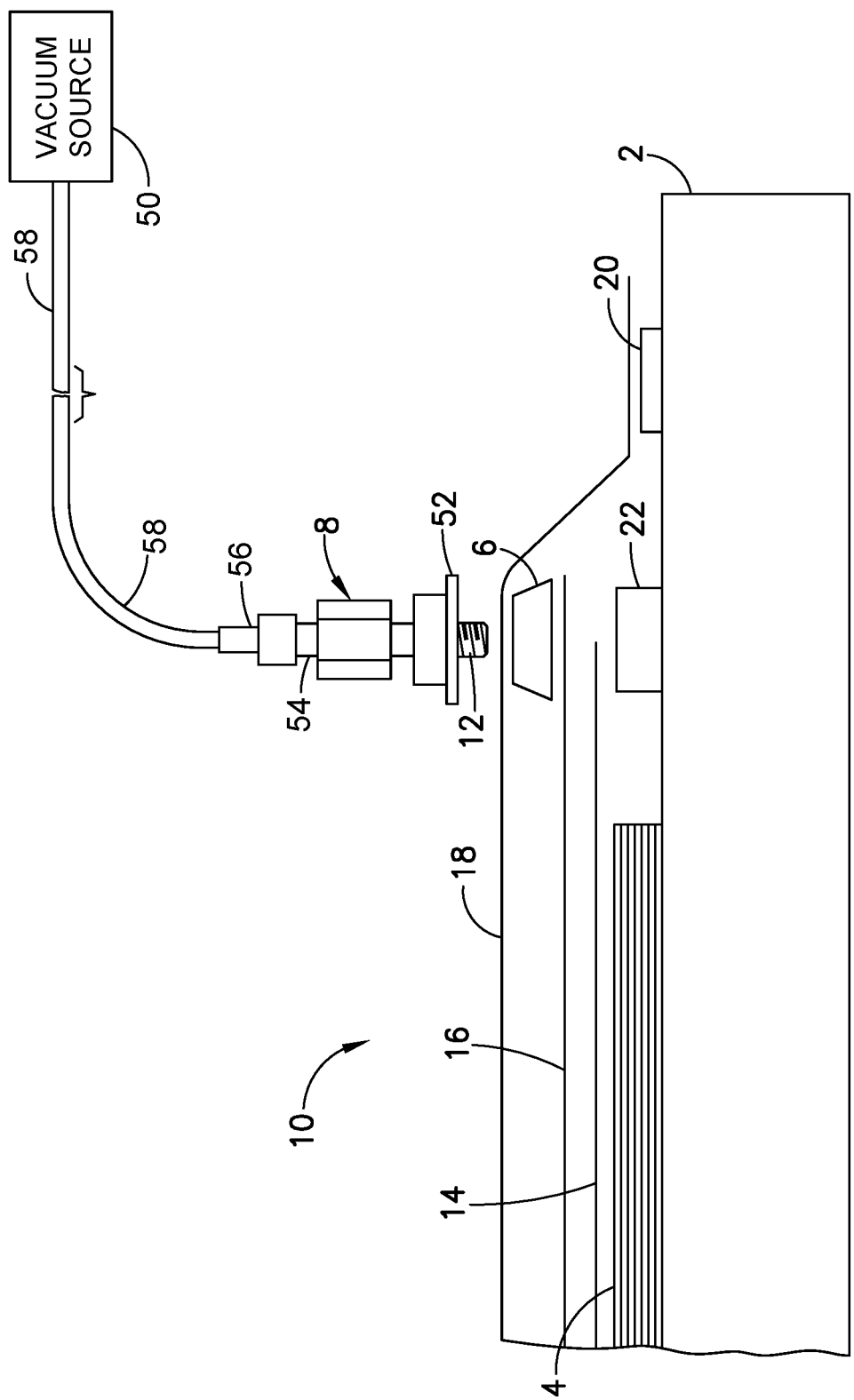
FIG. 14 is a diagram representing an exploded side view of a vacuum bag assembly for evacuating a sealed space underneath a vacuum bag and surrounding a composite part laid on a tool.

FIG. 14 is a diagram representing an exploded side view of a vacuum bag assembly 10 for evacuating a sealed space underneath an vacuum bag 18 and surrounding a composite part 4 laid on a tool 2. A release film overlies the composite part 4. A breather cloth 16 overlies the release film. (As used herein, the term "breather" means a porous material.) In turn, an vacuum bag 18 (made, e.g., of a sheet of nylon film) covers the breather cloth 16. The vacuum bag 18 is typically sealed to the surface of tool 2 by sealing tape 20 which surrounds the breather cloth 16 and the composite part 4. In an unevacuated state, the vacuum bag 18 fits loosely over the breather cloth 16, leaving open space therebetween.

Still referring to FIG. 14, the outer peripheries of the release film 14 and breather cloth 16 are sandwiched between an edge breather 22 (placed on the tool 2) and a vacuum probe base 6 having an internal threads for threadably engaging an externally threaded portion 12 of a vacuum probe 8. Typically the release film 14 does not end at the same place as the breather 16 and the edge breather 22. It will usually end halfway over the edge breather 22 or prior to it. This is because the breather 16 should make contact with the edge breather 22 to facilitate air flow. The release film 14 is non-porous and can cut off flow.

The coupling of the vacuum probe 8 to the vacuum probe base 6 is accomplished by forming an opening (not shown) in the vacuum bag 18, through which the externally threaded portion 12 of vacuum probe 8 is passed and then screwed into an internally threaded hole in the vacuum probe base 6. When vacuum probe 8 and vacuum probe base 6 are assembled (not shown in FIG. 14), the opening in the vacuum bag 18 is sealed by a sealant gasket 52, which is made of a compressible material that is squeezed between opposing surfaces of vacuum probe 8 and vacuum probe base 6 to seal around the opening in the vacuum bag 18.

The vacuum probe 8 is connected to a vacuum source 50 by means of a vacuum hose 58. A common type of coupling used to connect a vacuum hose 58 to a vacuum probe 8 is a valved quick connect/disconnect coupling. The structure and operation of various types of valved quick connect/disconnect couplings are well known, including many such couplings which are commercially available from Swagelok Company, Solon, Ohio. In the example, depicted in FIG. 14, the vacuum hose 58 is coupled to the vacuum probe 8 by inserting a male quick connect/disconnect coupling element 54 disposed at one end of the vacuum probe 8 into a female quick connect/disconnect coupling element 56 disposed at one end of the vacuum hose 58. The arrangement depicted in FIG. 14 is designed for use in a process by which a composite part made of composite material (e.g., carbon or boron fibers embedded in epoxy resin) is compacted, debulked and fully cured.

While methods for making composite parts from stacked partially cured sublaminate units made of composite material in sheet form have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method of forming a composite article, comprising:
   (a) applying adhesive on surfaces of a plurality of sublaminate units, each sublaminate unit comprising a multiplicity of plies, each ply comprising fibers impregnated with resin which has been initially cured to an initial cure stage of 30% to 50% of full cure;
   (b) arranging the plurality of sublaminate units in a stack;
   (c) pressing the stack of sublaminate units against a surface of a forming tool;
   (d) heating the stack of sublaminate units to an intermediate temperature above a glass transition temperature of the resin for a time interval sufficient to intermediately cure the resin to an intermediate cure stage of 50% to 70% of full cure while the stack is in contact with the surface of the forming tool to form a composite laminate having a contour defined by the surface of the forming tool; and
   (e) finally curing the resin in the composite laminate at a final temperature higher than the intermediate temperature to a final cure stage,
   wherein steps (c) and (d) are performed concurrently during a time interval,
   further comprising drilling an index hole in each sublaminate unit of the plurality of sublaminate units prior to step (a), wherein step (b) comprises passing a pin through the index hole in each sublaminate unit of the plurality of sublaminate units.

2. The method as recited in claim 1, wherein step (e) is performed while the composite laminate remains on the forming tool.

3. The method as recited in claim 1, further comprising:
removing the composite laminate from the forming tool; and
placing the composite laminate inside an oven,
wherein step (e) is performed while the composite laminate is inside the oven.

4. The method as recited in claim 1, further comprising trimming at least one sublaminate unit of the plurality of sublaminate units prior to step (a).

5. The method as recited in claim 1, further comprising preparing a surface of at least one sublaminate unit of the plurality of sublaminate units prior to step (a).

6. The method as recited in claim 5, wherein preparing a surface comprises one of the following processes: sanding, grit blasting, peel-ply removal, or plasma treatment.

7. The method as recited in claim 1, wherein the pins are made of nylon or polytetrafluoroethylene, further comprising removing the pins from the composite article after step (e).

8. The method as recited in claim 1, 1, further comprising enveloping the stack of sublaminate units in a vacuum bag prior to steps (c) and (d).

9. The method as recited in claim 1, wherein each sublaminate unit of the plurality of sublaminate units is balanced in a sense that for every ply having a +θ ply angle, there is another ply having a −θ ply angle somewhere in the sublaminate unit.

10. The method as recited in claim 1, wherein each sublaminate unit of the plurality of sublaminate units is symmetric.

11. The method as recited in claim 1, wherein a first sublaminate unit of the plurality of sublaminate units comprises plies having respective ply angles in accordance with a first configuration, and a second sublaminate unit of the plurality of sublaminate units comprises plies having respective ply angles in accordance with a second configuration different than the first configuration.

12. A method of forming a composite article, comprising:
(a) applying adhesive on surfaces of a plurality of sublaminate units, each sublaminate unit comprising a multiplicity of plies, each ply comprising fibers impregnated with resin which has been initially cured to an initial cure stage of 30% to 50% of full cure;
(b) arranging the plurality of sublaminate units in a stack;
(c) pressing the stack of sublaminate units against a surface of a forming tool;
(d) heating the stack of sublaminate units to an intermediate temperature above a glass transition temperature of the resin for a time interval sufficient to intermediately cure the resin to an intermediate cure stage of 50% to 70% of full cure while the stack is in contact with the surface of the forming tool to form a composite laminate having a contour defined by the surface of the forming tool; and
(e) finally curing the resin in the composite laminate at a final temperature higher than the intermediate temperature to a final cure stage,
wherein steps (c) and (d) are performed concurrently during a time interval,
further comprising:
applying adhesive on a stiffener comprising a multiplicity of plies, each ply comprising fibers impregnated with resin which has been initially cured to an initial cure stage of 30% to 50% of full cure; and
arranging the stiffener on top of the stack of sublaminate units.

13. The method as recited in claim 12, wherein the sublaminate units are planar and the stiffener is straight.

14. A method of forming a composite article, comprising:
(a) drilling an index hole in each sublaminate unit of a plurality of sublaminate units;
(b) arranging a plurality of sublaminate units in a stack with uncured adhesive between adjacent sublaminate units, each sublaminate unit comprising a multiplicity of plies, each ply comprising fibers impregnated with resin which has been initially cured to an initial cure stage of 30% to 50% of full cure, wherein the arranging comprises passing a pin through the index hole in each sublaminate unit of the plurality of sublaminate units;
(c) heating the stack of sublaminate units to an intermediate temperature above a glass transition temperature of the resin for a time interval sufficient to intermediately cure the resin to an intermediate cure stage of 50% to 70% of full cure;
(d) forming the heated stack of sublaminate units into a composite laminate having a surface defined by a surface of a forming tool; and
(e) finally curing the resin in the composite laminate at a final temperature higher than the intermediate temperature to a final cure stage.

15. The method as recited in claim 14, wherein the final cure stage is greater than 90% of full cure.

16. The method as recited in claim 14, wherein the pins are made of nylon or polytetrafluoroethylene.

17. The method as recited in claim 14, further comprising removing the pins from the composite article after step (e).

18. The method as recited in claim 14, further comprising:
applying adhesive on a stiffener comprising a multiplicity of plies, each ply comprising fibers impregnated with resin which has been initially cured to an initial cure stage of 30% to 50% of full cure; and
arranging the stiffener on top of the stack of sublaminate units.

19. The method as recited in claim 18, wherein the sublaminate units are planar and the stiffener is straight.

20. The method as recited in claim 14, wherein steps (c) and (d) are performed concurrently during a time interval.

* * * * *